United States Patent
Coon

(10) Patent No.: US 7,983,948 B2
(45) Date of Patent: Jul. 19, 2011

(54) SYSTEMS AND METHODS FOR ELECTRONIC MARKETING

(76) Inventor: Jonathan C. Coon, Salt Lake City, UT (US)

(*) Notice: Subject to any disclaimer, the term of this patent is extended or adjusted under 35 U.S.C. 154(b) by 702 days.

(21) Appl. No.: 12/030,305

(22) Filed: Feb. 13, 2008

(65) Prior Publication Data

US 2008/0126169 A1 May 29, 2008

Related U.S. Application Data

(63) Continuation of application No. 11/713,332, filed on Mar. 2, 2007.

(60) Provisional application No. 60/778,267, filed on Mar. 2, 2006.

(51) Int. Cl.
*G06Q 10/00* (2006.01)

(52) U.S. Cl. .......... 705/14.4; 705/14.48; 705/14.71

(58) Field of Classification Search .......... 705/7, 14, 705/14.4
See application file for complete search history.

(56) References Cited

U.S. PATENT DOCUMENTS

| | | | |
|---|---|---|---|
| 6,053,536 A * | 4/2000 | Clevenstine | 283/116 |
| 6,275,854 B1 * | 8/2001 | Himmel et al. | 709/224 |
| 6,370,682 B1 * | 4/2002 | Eckardt et al. | 717/141 |
| 6,421,675 B1 | 7/2002 | Ryan et al. | |
| 7,127,419 B2 * | 10/2006 | Messer et al. | 705/27 |
| 7,191,147 B2 * | 3/2007 | Heene et al. | 705/26 |
| 2004/0024640 A1 | 2/2004 | Engle et al. | |
| 2004/0153365 A1 | 8/2004 | Schneider et al. | |
| 2004/0158528 A1 | 8/2004 | Zuili | |
| 2004/0230491 A1 | 11/2004 | Messer et al. | |
| 2005/0021387 A1 | 1/2005 | Gottfurcht | |
| 2005/0028188 A1 | 2/2005 | Latona et al. | |
| 2005/0097204 A1 * | 5/2005 | Horowitz et al. | 709/223 |
| 2005/0144065 A1 | 6/2005 | Calabria et al. | |
| 2005/0144067 A1 | 6/2005 | Farahat et al. | |
| 2005/0193131 A1 * | 9/2005 | Bai et al. | 709/229 |

(Continued)

FOREIGN PATENT DOCUMENTS

WO WO/03102738 A2 11/2003

(Continued)

OTHER PUBLICATIONS

Nicole Immorlica1, Kamal Jain1, Mohammad Mandian1 and Kunal Talwar1, "Click Fraud Resistant Methods for Learning Click-Through Rate" Friday, Nov. 25, 2005,(1) Microsoft Research, Redmond, WA, USA, Book Series Lecture Notes in Computer Science, Publisher Springer Berlin / Heidelberg, ISSN 0302-9743 (Print) 1611-3349 (Online), vol. 3828/20.*

(Continued)

*Primary Examiner* — Jonathan G Sterrett
(74) *Attorney, Agent, or Firm* — Holland & Hart LLP

(57) ABSTRACT

An exemplary system includes a publisher subsystem configured to communicate with an access device and an advertiser device over a data communication network. The publisher subsystem includes a publish module, a session module, and an allocation module. The publish module is configured to publish content over the data communication network, the content including an advertisement. The session module is configured to detect a selection of the advertisement, initiate a session between the access device and the advertiser device in response to the selection, the advertiser device being associated with the advertisement, and receive feedback from the advertiser device. The allocation module is configured to allocate revenue based on the feedback. In some examples, the amount of the revenue is independent of the feedback.

5 Claims, 3 Drawing Sheets

U.S. PATENT DOCUMENTS

| | | |
|---|---|---|
| 2005/0256766 A1 | 11/2005 | Garcia et al. |
| 2006/0004594 A1 | 1/2006 | Doliov |
| 2006/0200555 A1 | 9/2006 | Shannon et al. |
| 2006/0212350 A1 | 9/2006 | Ellis et al. |
| 2007/0179853 A1* | 8/2007 | Feige et al. .................. 705/14 |
| 2007/0271133 A1 | 11/2007 | McElhinney |

FOREIGN PATENT DOCUMENTS

| | | |
|---|---|---|
| WO | WO/2005013092 A2 | 2/2005 |
| WO | WO/2005043353 A2 | 5/2005 |
| WO | WO/2005094199 A2 | 10/2005 |
| WO | WO/2007/062026 | 5/2007 |

OTHER PUBLICATIONS

Block, Michael; Eroshenko, Dimitri; "How to Defend Your Website Against Click Fraud", 2004, (C) Clicklab, pp. 1-20.*

D Dagon "Botnet Detection and Response", Cooperative Association for Internet Data Analysis DNS-OARC, OARC Workshop 2005, pp. 1-45.*

"On the security of pay-per-click and other Web advertising schemes" V Anupam, A Mayer, K Nissim, B Pinkas, MK Reiter—Comput. Networks, 1999—ece.cmu.edu. pp. 1-10.*

S. Jørgensen, S. Taboubi and G. Zaccour; "Cooperative Advertising in a Marketing Channel", Journal of Optimization Theory and Applications, Springer Netherlands, ISSN 0022-3239 (Print) 1573-2878 (Online), Issue vol. 110, No. 1 / Jul. 2001.*

Steffen Jørgensena, Simon Pierre Siguéb and Georges Zaccourc, "Dynamic cooperative advertising in a channel", Journal of Retailing, vol. 76, Issue 1, Spring 2000, pp. 71-92.*

Susan X. Li, Zhimin Huang and Allan Ashley, "Improving buyer-seller system cooperation through inventory control", International Journal of Production Economics, vol. 43, Issue 1, May 1, 1996, pp. 37-46.*

DL Hoffman, TP Novak, "When Exposure-Based Web Advertising Stops Making Sense (And What CDNOW Did About It)"—Paper ecommerce. vanderbilt. edu, 2000—sloan.ucr.edu.*

Dutta, et al, "Variations in the Contractual Terms of Cooperative Advertising Contracts: An Empirical Investigation", 1995, Marketing Letters, 6, 1, pp. 15-22.*

Jakobsson, Markus; MacKenzie, Philip D.; Stern, Julien P; "Secure and Lightweight Advertising on the Web"; (c)1999, Elsevier Science B.V. pp. 23-31.*

"Commission Junction, CJ.com", web.archive.org webpage of Feb. 29, 2000, pp. 1-2.*

"Google Adwords FAQ", web.archive.org webpage of Dec. 7, 2001, pp. 1-10.*

Ives,Nat; Web Marketers Fearful of Fraud in Pay-Per-Click; Journal(New York Times); Mar. 3, 2005; The Gale Group; (abstract only).

Data Shaping Solutions Eradicates Click Fraud; Journal(Business Wire); Oct. 13, 2004; The Gale Group; (abstract only).

Kitts et al; Click Fraud; Journal(Bulletin of the American Society for Information Science & Technology); Dec. 1, 2005; pp. 20-23; ProQuest; (abstract only).

Think Partnership Signs Letter of Intent to Acquire Litmus Media . . . ; Dec. 19, 2005; ProQuest; (abstract only).

Siebel Systems Selects Search Force to Manage Search Marketing Campaigns and Maximize Click-Through Traffic and Profitability; Sep. 28, 2005; (abstract only).

Independent Search Engine & Directory Network Offers Alternative to Pay-Per-Click; Jul. 21, 2005; ProQuest; (abstract only).

Lost Clicks—Web site to Track Click Fraud; May 19, 2005; ProQuest; (abstract only).

Tygo.com Raises Bar by Lowering Search Engine Ad Costs; Sep. 10, 2004; The Gale Group; (abstract only).

NetApplications Adds Click Fraud Reporting to Its Popular HitsLink Web Site Statistics and Keyword Analytics Tool; Mar. 3, 2005; ProQuest; (abstract only).

The Buck Starts Here—New Search Engine Announces Flat-Rate Advertising for a Buck a Month on Tygo.com; Jul. 21, 2004; The Gale Group; (abstract only).

Snap.com Introduces Risk-Free, Cost-Per-Action Search Advertising; First Search Engine to Go beyond . . . ; Feb. 28, 2005; ProQuest; (abstract only).

Urchin 5.5 With Campaign Tracking Module Released—Ushers in New Era of Marketing Intellingence; Jan. 14, 2004; The Gale Group; (abstract only).

Clicklab Releases White Paper on Click Fraud as Google Files First Click Fraud Lawsuit against AdSense Publisher; Nov. 29, 2004; ProQuest; (abstract only).

New Search Engine Tygo.com, Gives Away $5,000,000 in Advertising; Aug. 24, 2004; ProQuest; (abstract only).

Lisa Kovach; Fraud a new Concern for Online Advertisers; Journal(San Diego Business Journal); Mar. 3, 2005; vol. 26; No. 12; ProQuest; (abstract only).

Tim Lemke; White Marsh Company Creates Tracking Strategies to Stop New Online Fraud; Journal(Daily Record); Dec. 21, 2004; ProQuest; (abstract only).

Clicklab Launches Click Fraud Audit Sercives for Pay-Per-Click (PPC) Advertisers and Publishers;Journal(Business Wire); Oct. 25, 2005; The Gale Group; (abstract only).

Zunch Communications, Inc. Announces Click Fraud Detective; New Click Fraud Auditing System Premieres This Week at SES San Jose; Journal(Business Wire); Aug. 8, 2005; The Gale Group; (abstract only).

As Much as 29.5 Percent Click Fraud in Google's Pay-Per-Click Search Engine . . . ; Journal(Business Wire); Aug. 2, 2005; The Gale Group; (abstract only).

Surging "Click Fraud" Imperils Internet Marketing; Click-Fraud Cost may Hit $1 Billion Yearly; Journal(Business Wire); Jul. 18, 2005; The Gale Group; (abstract only).

Clicklab Unveils New Technology to Fight Click Fraud; Journal(Business Wire); Feb. 28, 2005; The Gale Group; (abstract only).

TrackingROI Launches Website Community for Fighting Click Fraud . . . ; Jounal(PR Newswire); Dec. 20, 2004; The Gale Group; (abstract only).

Click Fraud Victim Fights Back With New Software; Journal(PR Newswire); Dec. 6, 2004; The Gale Group; (abstract only).

Fred O. Williams; Kanoodle Signs Deal with Turner Sports; Amherst Firm will . . . ; Journal(Buffalo News); Aug. 12, 2005; ProQuest; (abstract only).

Click Fraud; Encyclopedia(Wikipedia); (abstract only).

Krysten Crawford; Google CFO: Fraud a Big Threat; (CNN/Money) Dec. 2, 2004; (abstract only).

Richard Raysman et al; Click Fraud: A Growing Concern; Journal(New York Law Journal); Dec. 13, 2005;.

Brad Stone; When Mice Attack; Journal(Newsweek); Jan. 24, 2006;.

Stefanie Olsen; Exposing Click Fraud; News.com; Jul. 2004.

Click-Fraud a Gathering Storm; Dec. 30, 2005.

Tom Zeller Jr.; With Each Technology Advance, a Scourge; Journal (New York Times); Oct. 18, 2004.

Adam L. Penenberg; Journal(Wired Magazine); Oct. 13, 2004.

Charles C. Mann; How Click Fraud Could Swallow the Internet; Journal (Wired Magazine); Jan. 2006.

Zunch Communications, Inc. Announces Click Fraud Detective, New click Fraud Auditing System Premieres this week at SES San Jose; Business Wire; Aug. 8, 2005.

Shea, Bill; Costly Clicks; Jan. 22, 2007; Journal(Crain's Detroit Business) vol. 23, No. 4, pp. 1.

Kopytoff, Verne; Click Fraud a Huge Problem / Study finds practice widespread; many cut back online ads; Jul. 5, 2006; Journal(San Fransisco Chronicle).

* cited by examiner

SYSTEMS AND METHODS FOR ELECTRONIC MARKETING

CROSS-REFERENCES TO RELATED APPLICATIONS

This application is a Continuation application of U.S. application Ser. No. 11/713,332, filed Mar. 2, 2007, which application claims the benefit under 35 U.S.C. §119(e) of U.S. Provisional Patent Application No. 60/778,267 filed Mar. 2, 2006, which applications are incorporated herein by reference in their entireties.

BACKGROUND

The popularity of the Internet has made it a productive advertising medium. The online advertising market has continued to grow in recent years, fueled in large measure by paid search advertising. In paid search advertising models, advertisers pay for placement of their advertisements within or alongside search results that are generated by search engines in response to queries received over the Internet. This type of advertising has become attractive to advertisers at least because it can be targeted to potential consumers having sufficient interest to submit related queries. In addition, paid search advertising allows advertisers to pay based on quantifiable actions elicited by advertisements. That is, the costs of an advertisement are directly related to a measured quantity of actions elicited by the advertisement.

One popular form of paid search advertising allows advertisers to pay for each "click" (i.e., a click of a mouse) elicited by advertisements. This form of paid search advertising is commonly referred to as pay-per-click ("PPC") or cost-per-click ("CPC") advertising. In PPC advertising, advertisers submit bids to a search engine for placement of advertisements within search results. Accordingly, the placement of the advertisements within search results generated by the search engine is based, at least in part, on the bids, with higher bids generally winning preferential placement within the search results. Such bid-based placement techniques often encourage competing advertisers to drive up advertising costs, thereby increasing the revenues collected by the search engine.

When a potential consumer submits a query to the search engine, the search engine responds by providing search results containing PPC advertisements. If the potential consumer selects (e.g., clicks on) one of the PPC advertisements, the search engine will direct the potential consumer to a site hosted by the corresponding advertiser and charge the advertiser an agreed-upon cost-per-click amount. In theory, PPC advertising provides a result-based advertising technique in which advertisers pay for actual interest shown in advertisements, with the interest being measured in terms of the number of clicks on advertisements.

Search engine affiliates also use PPC advertising for revenue. An affiliate may operate a site and team with a search engine to have PPC advertisements published by the search engine posted on the affiliate site. When a potential consumer visits an affiliate site and selects one of the PPC advertisements delivered to the affiliate site by the search engine, the potential consumer is directed to a site hosted by the advertiser associated with the selected advertisement. The search engine charges the advertiser for the click and shares the proceeds from the click with the affiliate that generated the click.

Unfortunately, conventional PPC advertising models have a number of shortcomings, including vulnerability to fraud and manipulation, as well as inherent conflicts of interest. One significant threat to PPC advertising is commonly referred to as "click fraud." Click fraud occurs when a person or automated process exploits PPC advertising models by clicking on a PPC advertisement with no intent to do business with the corresponding advertiser.

There are two predominant types of click fraud—competitive click fraud and affiliate click fraud. Competitive click fraud occurs when an advertiser clicks on a competitor's PPC advertisement in order to drive up and waste the competitor's advertising dollars on unproductive clicks. Affiliate click fraud occurs when a person or machine associated with an affiliate site clicks on PPC advertisements on the affiliate site in order to increase revenue. Both forms of click fraud increase advertising costs without providing any value to advertisers.

Affiliate click fraud reduces publisher revenues by allocating advertising proceeds to illegitimate or at least unproductive, affiliates that generate unproductive clicks. Competitive click fraud can increase publisher revenue in the short term, but potentially decrease publisher revenue in the long term as advertisers who realize artificially inflated customer acquisition costs may decide to spend their advertising dollars elsewhere.

Regardless of the type of click fraud or the motives behind it, click fraud has become a significant problem for advertisers, search engines, and legitimate affiliates. Perpetrators have come up with schemes that make fraudulent clicks difficult to identify. Computer programs commonly referred to as "hitbots" have been developed to repeatedly click on PPC advertisements. Some hitbots are highly sophisticated. For example, hitbots exist that are able to change or mask the Internet Protocol ("IP") addresses associated with computers producing the clicks. Other hitbots are able to hijack and control computers connected to the Internet and use the hijacked computers to produce clicks, often with the operators of the hijacked computers being unaware. Perpetrators have also been known to develop teams of people who are paid to click on PPC advertisements. "Click farms," as these teams are commonly called, have sprouted up throughout the world to make money simply for producing fraudulent clicks on PPC advertisements.

Search engines and other publishers of PPC advertisements have attempted to combat click fraud. Electronic filters and human teams have been employed to identify click patterns that might be representative of click fraud. However, such forms of policing cannot identify all fraudulent clicks. Moreover, the policing efforts are expensive, especially when compared with the financial incentives to generate fraudulent clicks and the relative ease and low-cost with which fraudulent clicks can be generated.

Another problem that click fraud introduces into PPC advertising is an inherent conflict of interest for search engines. On one hand, search engines have an interest in policing and stopping click fraud to keep advertisers satisfied. On the other hand, however, successfully identifying click fraud and issuing refunds to advertisers decreases search engine revenues. Therefore, while search engines are in a natural position to police click fraud, the search engines may to a certain extent lack motivation to identify and stop all fraudulent clicks because doing so would decrease revenues.

Clearly, conventional PPC advertising models are easy to manipulate and difficult to police. Incredulous persons and entities have been and will most likely continue to manipulate PPC advertising. Consequently, conventional PPC advertising models can inflate advertiser costs without any increase in returns.

Moreover, conventional PPC advertising models result in lower revenues for search engines and legitimate affiliates as they are forced to share advertising revenues with illegitimate affiliates perpetrating click fraud.

Another form of paid search advertising has been viewed as a potential remedy to click fraud. This form of advertising is commonly referred to pay-per-action ("PPA") or cost-per-action ("CPA") advertising. In PPA advertising, advertisers are charged when consumers both click on PPA advertisements and complete another specified action. The action may be agreed upon in advance by an advertiser and a search engine publisher and may include actions such as a consumer submitting an order, making a purchase, or completing a registration.

While advertisers may find PPA advertising attractive because they would no longer be charged for unproductive clicks, search engine publishers may be reluctant to employ PPA advertising because it may decrease revenues and because of the ease with which advertisers could manipulate results. Under conventional PPA advertising models, the results reported by advertisers directly increase or decrease the payments made by the advertisers, which models create a financial incentive to underreport results. Because accounting efforts would shift to the advertisers, PPA advertising models effectively put advertisers on their honor to accurately report every action elicited by advertisements. Search engine publishers would almost certainly insist on policing advertisers to ensure that all billable actions are accurately reported. This would require burdensome and expensive policing of the advertisers. Despite the shortcomings of conventional PPC advertising, search engine publishers are unlikely to adopt a PPA system as it requires that publishers police advertisers and incoming revenue and further requires (100) % participation by advertisers on all sessions and transactions.

In sum, conventional paid search advertising models are easy to manipulate and require substantial and expensive policing efforts to maintain satisfaction among all parties involved. Click fraud has become a serious threat to the existing PPC advertisement models. PPA advertisement models might theoretically help combat click fraud. As described above, however, PPA advertisement models include a number of shortcomings that may render such models impractical. Accordingly, the state-of-the-art does not include a practical and viable paid search advertisement technology capable of overcoming problems associated with click fraud.

BRIEF DESCRIPTION OF THE DRAWINGS

The accompanying drawings illustrate various embodiments of the principles described herein and are a part of the specification. The illustrated embodiments are merely examples and do not limit the scope of the disclosure. Throughout the drawings, identical reference numbers designate identical or similar elements.

DETAILED DESCRIPTION

I. Introduction

This specification describes systems and methods for paid search advertising. The systems and methods described herein allocate advertising revenues based on feedback received from advertisers. The feedback may be descriptive of the results of sessions produced by advertisements. The results-based feedback gives advertisers a reliable, measurable, and value-driven way to advertise.

Compared with conventional paid search advertising models, the systems and methods described herein are easier to police, more difficult to manipulate, and generally more productive for advertisers, search engine publishers, and legitimate affiliates. Significantly, the systems and methods described herein eliminate, or at least reduce, the financial incentives to perpetrate click fraud because selections of advertisements (e.g., clicking on an advertisement) by themselves do not increase or decrease advertiser costs. Thus, click fraud cannot be used by illegitimate affiliates to artificially inflate payments to them or by advertisers to drive up costs for competitors. Accordingly, advertisers can confidently use paid search advertising without many of the problems associated with conventional paid advertising models.

In addition, the systems and methods described herein generally provide incentive for advertisers to accurately report results because doing so will reward productive sources of value without rewarding unproductive sources of clicks. Over time, accurate feedback provided by advertisers may benefit the advertisers because the number of productive sources may tend to increase while unproductive sources take their business elsewhere (e.g., a search engine using a conventional PPC advertising model that rewards unproductive sources). Thus, to the benefit of advertisers, accurate reporting of results can increase the effectiveness of advertisements published by a publisher implementing the paid search advertising systems and methods described herein.

Unlike a conventional PPA advertising model, advertiser costs do not increase or decrease based on the feedback provided by the advertiser because advertiser payment is disconnected from advertiser feedback. Accordingly, there is no incentive for advertisers to underreport results. Because of the incentives for advertisers to voluntarily and accurately report results, the systems and methods described herein significantly reduce the policing efforts and costs commonly associated with both PPC and PPA conventional advertising models.

These and other uses and benefits of the systems and methods described herein will become apparent upon consideration of the following examples.

II. Exemplary System View

Figure 1:
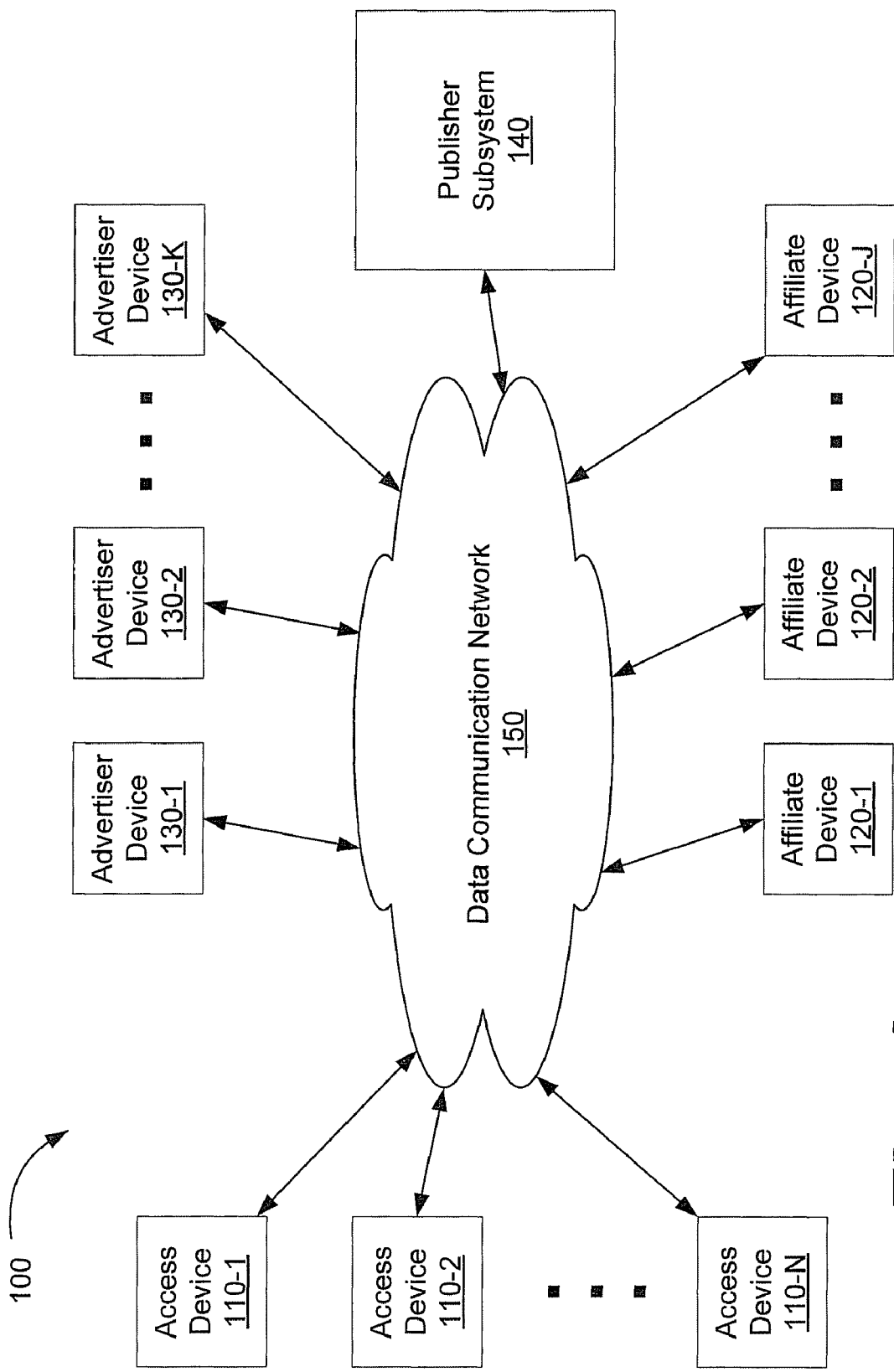
FIG. 1 is a block diagram illustrating an exemplary paid search advertising system, according to principles described herein.

FIG. 1 illustrates an example of a paid search advertisement system (100). As shown in FIG. 1, the system (100) may include access devices (110-1 through 110-N) (collectively "access devices (110)"), affiliate devices (120-1 through 120-J) (collectively "affiliate devices (120)"), advertiser devices (130-1 through 130-K) (collectively "advertiser devices (130)"), and a publisher subsystem (140) communicatively coupled to one another by a data communication network (150). In some examples, the data communication network (150) includes the Internet or World Wide Web. Access devices (110), affiliate devices (120), advertiser devices (130), and the publisher subsystem (140) may communicate over the data communication network (150) using any known communication technologies, devices, media, and protocols supportive of remote communications, including, but not limited to, transmission media, communications devices, Transmission Control Protocol ("TCP"), Internet Protocol ("IP"), File Transfer Protocol ("FTP"), telnet, Hypertext Transfer Protocol ("HTTP"), socket connections, packet-switching technologies, circuit-switching technologies, wireless communication technologies (e.g., cellular telephone and wireless access technologies), and any other suitable communications technologies.

Users of the system (100) may be grouped into different categories having different levels of access to different functions provided by the system (100). Users associated with the access devices (110) may be referred to as "consumers," users associated with the affiliate devices (120) may be referred to as "affiliates," users associated with the advertiser devices (130) may be referred to as "advertisers," and users associated with the publisher subsystem (140) may be referred to as "publishers."

Through access devices (110), consumers are able to interact with advertiser devices (130), including accessing and considering content hosted by the advertiser devices (130), providing input to and receiving output from the advertiser devices (130), and participating in sessions between access devices (110) and advertiser devices (130). Because consumers may not be aware of advertisers, or how to access advertiser devices (130), advertisers typically pay publisher subsystem (140) for placement of advertisements within content published by publisher subsystem (140). Typically, the content includes keyword search results, and the bids are for the right to have advertisements included in keyword search results that are published during a predefined time interval.

The content may be published on a site hosted by a publisher subsystem (140) or one or more sites hosted by affiliate devices (120). Accordingly, consumers can use access devices (110) to interact with affiliate devices (120) and a publisher subsystem (140) over the data communication network (150) to view content, including published advertisements associated with the advertisers. When consumers select published advertisements (e.g., by clicking on a hyperlink of an advertisement), affiliate devices (120) and/or the publisher subsystem (140) may direct the access devices (110) used by the consumers to sites hosted by advertiser devices (130) to begin sessions between the access devices (110) and respective advertiser devices (130). The publisher subsystem (140) may also provide advertiser devices (130) with a session identifier for each session, as described in more detail further below.

Sessions between access devices (110) and advertiser devices (130) may produce different events and results, including, but not limited to, completion of sales to consumers, placement of orders, submission of information, completion of registrations and/or applications, downloads, receipt of referrals, receipt of subscriptions, or no measurable actions other than initiation of the sessions.

Advertisers may provide feedback about the sessions to the publisher subsystem (140). The feedback is typically representative results produced during sessions. The feedback may indicate whether the sessions added value to the advertisers (e.g., whether or not a sale was completed), or the feedback may indicate the quality or amount of value added to advertisers. The feedback may be provided by advertiser devices (130) to the publisher subsystem (140) over the data communication network (150) automatically and without human intervention, or in any other suitable manner.

The publisher subsystem (140) may be configured to allocate advertising revenues (e.g., bid amounts paid by advertisers) based on the feedback received from the advertisers. The revenues are typically allocated among sources of the results represented by the feedback, including the publisher and any of the affiliates that produced sessions resulting in positive feedback, as described further below.

While an exemplary system (100) is shown in FIG. 1, those skilled in the art will recognize that the exemplary components illustrated in the Figure are not intended to be limiting. Indeed, those skilled in the art will recognize that other alternative hardware environments and implementations may be used. Each of the components of the system (100) will now be described in additional detail.

A. Data Communication Network

The data communication network (150) may include one or more networks suitable for carrying communications between access devices (110), affiliate devices (120), advertiser devices (130), and the publisher subsystem (140). For example, the data communication network (150) may include, but is not limited to, the Internet, World Wide Web and/or one or more intranets, local area networks, wide area networks, voice communication networks (e.g., the Public Switched Telephone Network ("PSTN"), Voice over Internet Protocol ("VoIP"), and wireless telephone networks), video and/or audio broadcasting networks (e.g., satellite and cable television networks), access networks, packet-switched networks, circuit-switched networks, and any other communications networks capable of carrying communications between access devices (110), affiliate devices (120), advertiser devices (130), and/or the publisher subsystem (140). The data communication network (150) may include any devices, media, and technologies helpful for carrying communications between access devices (110), affiliate devices (120), advertiser devices (130), and the publisher subsystem (140).

B. Access Devices

Each access device (110) may include any device or devices physically or remotely accessible to one or more consumers and that allows a consumer to provide input to and/or receive output from affiliate devices (120), advertiser devices (130), and/or the publisher subsystem (140) over the data communication network (150). For example, an access device (110) can include, but is not limited to, one or more desktop computers, laptop computers, tablet computers, personal computers, personal data/digital assistants, cellular telephones, satellite pagers, wireless internet devices, embedded computers, video phones, network interface cards, modems, optical network terminals, mainframe computers, mini-computers, programmable logic devices, vehicles, entertainment devices, gaming devices, music devices, wireless communication devices, wireline communication devices, Internet Protocol ("IP") devices (e.g., IP-based phones), Session Initiation Protocol ("SIP") devices (e.g., SIP phones), set-top boxes, televisions, display devices, and any other devices capable of communicating with affiliate devices (120), advertiser devices (130), and/or the publisher subsystem (140) over the data communication network (150). The access device (110) can also include various peripherals such as a terminal, keyboard, keypad, mouse, screen, printer, stylus, microphone, audio speaker, input device, output device, or any other apparatus that can help a user interact with the access device (110).

Access devices (110) may be configured to access sites (e.g., web sites) hosted by affiliate devices (120), advertiser devices (130), and the publisher subsystem (140). In particular, access devices (110) can participate in sessions with sites hosted by the publisher subsystem (140) and/or any of the affiliate devices (120) to simply receive and present content for consideration by consumers, or to submit requests for specific content, including requests in the form search queries (e.g., keyword searches). In response, content may be received by the access devices (110) for consideration by consumers. The content typically includes paid advertisements associated with advertisers. Accordingly, consumers can select advertisements (e.g., click on hyperlinks included in the advertisements) to be directed to additional information.

When a consumer selects a particular advertisement, the access device (110) being used by the consumer is directed to a particular advertiser device (130) associated with the advertisement, and a session is initiated between the access device (110) and the advertiser device (130). As described further below, sessions between access devices (110) and advertiser devices (130) can produce different results.

Access devices (110) may include instructions for generating and operating user interfaces. These instructions may be in any computer-readable format, including software, firmware, microcode, and the like. When executed by a processor (not shown) of a particular access device (110), the instructions may present one or more user interfaces to a user. The user interfaces may be configured to present information to and receive input from consumers, including information associated with search results, advertisements, selections of advertisements, and sessions with sites hosted by affiliate devices (120), advertiser devices (130), and/or the publisher subsystem (140). The user interfaces may comprise one or more graphical user interfaces ("GUI") capable of displaying information and receiving input from users. In certain embodiments, the user interfaces include one or more web browsers, such as Internet Explorer® offered by Microsoft Corporation of Redmond, Wash.

Access devices (110) may be configured to utilize any suitable access technologies to access the data communication network (150), including, but not limited to, known access networks, media, and protocols.

C. Advertiser Devices

Advertiser devices (130) may be configured to communicate with any of the access devices (110), affiliate devices (120), and the publisher subsystem (140) of the system (100) over the data communication network (150). Each advertiser device (130) may include one or more devices configured to communicate over the data communication network (150), including, but not limited to, hosting one or more sites, communicating with the publisher subsystem (140) (e.g., providing bids and/or feedback to the publisher subsystem (140)), and participating in sessions with access devices (130). For example, an advertiser device (130) can include, but is not limited to, one or more servers (e.g., web servers), computers, network access devices, and any other devices capable of communicating with the access devices (110), affiliate devices (120), and/or publisher subsystem (140) over the data communication network (150).

Advertisers may use advertiser devices (130) to host sites (e.g., web sites) providing content associated with the advertisers. Access devices (110) can access the sites hosted by advertiser devices (130). Accordingly, sessions can be conducted between access devices (110) and advertiser devices (130). The sessions allow consumers to interact with the sites hosted by advertiser devices (130) to produce different results.

A session between an access device (110) and an advertiser device (130) may allow a consumer to perform a variety of actions, including, but not limited to, considering content hosted by the advertiser device (130), researching services or products, providing information (e.g., contact and payment information) to the advertiser device (130), making a purchase, completing a registration, application, or survey, providing a consumer review of a product or service, placing an order, completing a sale, providing a referral, submitting a question or an answer to a question, and any other interaction between the consumer and the advertiser device (130). Any of the above-listed actions may be predefined as an event or events that add value to the advertiser. In certain embodiments, a predefined event includes completion of a sale during a session.

Advertiser devices (130) may be configured to provide feedback to the publisher subsystem (140) for each session. The feedback may indicate whether one or more predefined events occurred during a session (i.e., whether the session resulted in value being added to the advertiser). For example, a predefined session event may include a sale being made to a consumer. When a particular session results in a sale, the corresponding advertiser device (130) may provide positive feedback to the publisher subsystem (140). When the session does not result in a sale, the advertiser device (130) may provide negative feedback to the publisher subsystem (140). In certain embodiments, positive feedback is provided in the form of a binary "1," and negative feedback is provided in the form of a binary "0." Of course, other predefined events may be used to determine whether to provide positive or negative feedback to the publisher subsystem (140).

In other embodiments, session feedback may be descriptive of a level or quality of value added to an advertiser during a session. For example, a rating scale could be used to identify different levels of value. The rating scale may be numerical (e.g., a scale of zero to ten) and may be representative of monetary values produced by session (e.g., the amount of a sale).

Different rating scales may be employed for different keywords, products, services, markets, product categories, service categories, etc. The publisher could define the scales. The scales could be determined by advertiser vote (e.g., selected from options offered by the publisher). In this manner, advertisers associated with a common category (e.g., advertisers selling similar products) are able to provide uniform feedback based on a predefined scale.

It is also anticipated that different feedback may be provided for different predefined session events. For example, a high feedback score may be provided when a session results in a sale, a medium feedback score may be provided when a session results in a consumer providing registration information, and a low feedback score may be provided when a session results in a consumer providing a review of a product or service. The different feedback scores may be provided to the publisher subsystem (140) individually, or they may be batched and provided to the publisher subsystem (140), or feedback scores may be provided individually and subsequently batched. Publisher might request both the individual feedback scores and a subsequent batch report so that the batch report could confirm that the individual feedback scores were accurately reported.

In certain embodiments, the providing of feedback is voluntary. That is, advertisers elect whether or not to provide feedback for sessions. However, as mentioned above, the system (100) provides incentive for advertisers to provide feedback, including advertisements becoming more effective as productive sources of results are rewarded and as lack of reward motivates unproductive sources of clicks to either move to another publisher or to change to become productive.

Over time, unproductive and illegitimate affiliates will likely move to become affiliates in conventional PPC advertising or other models that continue to reward unproductive clicks. Conversely, legitimate and productive affiliates may be motivated to migrate to the publisher using the publisher subsystem (140) because the system (100) generally allocates a larger share of advertising revenues to productive affiliates.

By not allocating shares of revenues to unproductive affiliates, revenues can increase for the publisher and for productive affiliates.

Even if advertisers do not provide feedback for every session, the system (100) is still generally able to allocate revenues in an appropriate manner so as to reward productive sources of value without rewarding unproductive sources of clicks. The above-described incentives to provide feedback should motivate advertisers to provide sufficient feedback for determining an accurate, representative allocation, based on results. Thus, the system (100) does not require one hundred percent participation from all advertisers all of the time.

Of course, advertiser devices (130) may be configured to automatically provide feedback upon detection of one or more predefined events occurring during sessions. This makes it simple for advertisers to provide feedback and ensures that sufficient feedback is received for accurate identification of sources of value and proper allocation of advertising revenue.

The feedback may include limited information (e.g., a simple positive or negative indication) so as to protect information that may be considered proprietary or sensitive to consumers and advertiser. In effect, advertisers are able to provide meaningful feedback without having to disclose proprietary or sensitive information related to the business of the advertiser or to consumers. The feedback may generally include information that is indicative of results but that also allows advertisers to provide the feedback without opening their accounting books to the publisher. Likewise, publishers may deliver a session to advertisers without disclosing the source of any session, whether from any publisher device (140) or any affiliate device (120).

Advertiser devices (130) may be configured to submit bids for placement of advertisements to the publisher subsystem (140) over the data communication network (150). Bid submissions may be automated, or advertisers may use advertiser devices (130) to submit bids. Of course, the advertisers may submit bids to the publisher subsystem (140) in any suitable manner.

The bids are typically for placement of advertisements within content published by the publisher subsystem (140). Higher bids may win preferential placement of advertisements within content published by the publisher subsystem (140). Of course, bids may be just one factor, and the publisher subsystem (140) may take other factors into account to determine placement of advertisements. For example, the publisher subsystem (140) may base advertisement placement on a variety of factors, including, but not limited to, relevancy of advertisements to search queries (e.g., relevancy of advertisements to keywords included in queries), consumer reviews, closing rates (described further below), and any other factor suitable for determining a placement of an advertisement within published content.

In certain embodiments, the bids are for placement of advertisements in content published by the publisher subsystem (140) during a predefined time interval. Accordingly, for content published during the predefined time interval, placement of advertisements within the content will be determined, at least in part, on the bids that are valid for the predetermined time interval. Placement rights may be different outside of the predefined time interval, with different bids being used to determine placements during subsequent time intervals.

The predefined time interval may be an hour, day, week, or any suitable length of time. The predefined time interval may be defined as a length of time that is designed to increase advertising revenues. For example, if the predefined time interval is approximately a week, the value of owning a winning bid becomes more valuable than for a short period of time. This may tend to motivate advertisers to increase their bids because of the importance of winning preferential placement for an extended period of time.

As described further below, the content within which advertisements will be published may include search results generated by a search engine in response to a request (e.g., a search query). Requests may be provided by access devices (110) directly to the publisher subsystem (140) or indirectly through affiliate devices (120).

D. Affiliate Devices

Affiliate devices (120) may be configured to host sites that may include advertisements, or links to advertisements, provided by the publisher subsystem (140). Search tools, or links to search tools, provided by the publisher subsystem (140) may also be accessible through the sites hosted by affiliate devices (120), as will be understood by those skilled in the art.

Consumers may use access devices (110) to access the sites hosted by the affiliate devices (120) over the data communication network (150). Accordingly, consumers are able to access advertisements and/or search tools provided by the publisher subsystem (140) through affiliate devices (120). When a particular consumer uses an access device (110) to select on an advertisement in a site hosted by an affiliate device (120), the access device (110) may be directed to the advertiser device (130) associated with the selected advertisement. Typically, the affiliate device (120) directs the access device (110) to the publisher subsystem (140), which then directs the access device (110) to the advertiser device (130). The directing of the access device (110) to the advertiser device (130) initiates a session between the two devices.

Typically, affiliates agree with the publisher to share revenues paid to the publisher by the advertisers. The share of revenues may be based on the value that the affiliates produced for the advertisers, as indicated by feedback received from the advertisers. For example, an affiliate may receive a share of revenues based on the number of sessions between access devices (110) and advertiser devices (130) that originated at an affiliate device (120) and for which positive feedback was received from the advertisers. This number may be compared to numbers produced by the publisher and other affiliates to determine a ratio at which advertising revenues will be allocated between the publisher and the affiliates. Examples of revenue-sharing between the publisher and affiliates will be described further below.

E. Publisher Subsystem

The publisher subsystem (140) may include any device or combination of devices (e.g., servers) useful for communicating with access devices (110), affiliate devices (120), and advertiser devices (130) over data communication network (150). The publisher subsystem (140) may be configured to include and/or utilize any suitable network access technologies, including, but not limited to, servers (e.g., web servers), security technologies, access levels, predefined access rules, firewalls, user lists, sign-on technologies, content hosting technologies, and any other technologies for communicating with access devices (110), affiliate devices (120), and advertiser devices (130) over the data communication network (150).

In certain embodiments, the publisher subsystem (140) is implemented in one or more computers. The publisher subsystem (140) may include any computer hardware and/or instructions (e.g., software programs), or combinations of software and hardware, configured to perform the processes described herein. In particular, it should be understood that the publisher subsystem (140) may be implemented on one physical computing device or may be implemented on more than one physical computing device. Accordingly, the publisher subsystem (140) may include any one of a number of computing devices known to those skilled in the art (e.g., one or more servers), and may employ any of a number of computer operating systems known to those skilled in the art, including, but by no means limited to, known versions and/or varieties of the Microsoft Windows® operating system, the Unix operating system, and the Linux operating system.

Accordingly, those skilled in the art will recognize that the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The publisher subsystem (140) may receive a variety of information from access devices (110), affiliate devices (120), and advertiser devices (130). For example, the publisher subsystem (140) may receive data representative of user registration and/or logon information, information associated with or descriptive of requests (e.g., search queries), bids submitted by advertisers, feedback provided by advertisers, and advertisement selections. The publisher subsystem (140) may also make a variety of information available to access devices (110), affiliate devices (120) and advertiser devices (130). For example, the publisher subsystem (140) may provide data representative of user registration and/or logon information, information associated with bids or bid solicitations, published content (e.g., search results including advertisements), and session identifiers.

Figure 2:
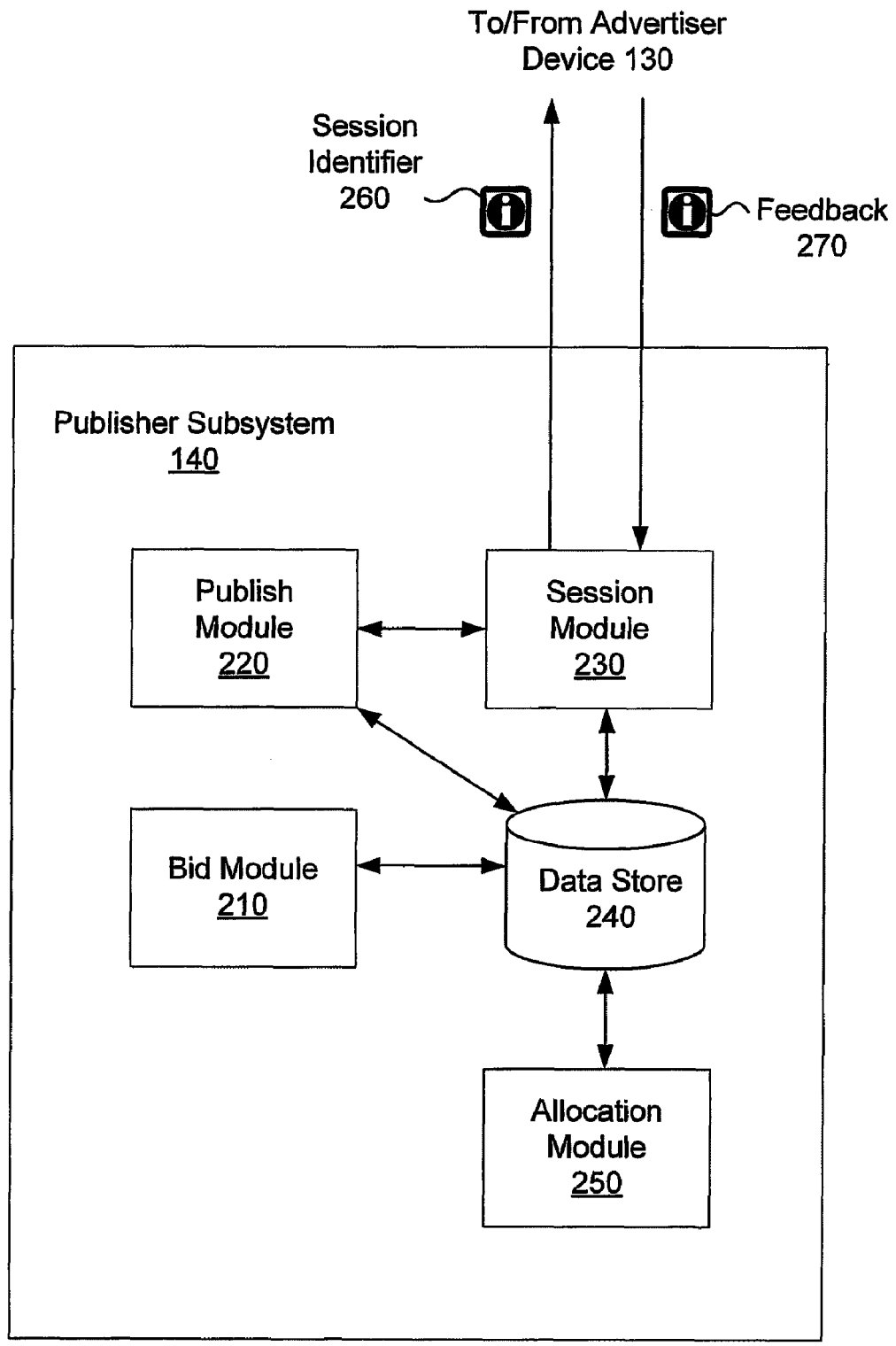
FIG. 2 is a block diagram of an exemplary publisher subsystem of FIG. 1, according to principles described herein.

FIG. 2 is a block diagram illustrating exemplary components of the publisher subsystem (140). As shown in FIG. 2, publisher subsystem (140) may include a bid module (210), a publish module (220), a session module (230), a data store (240), and an allocation module (250) communicatively coupled to one another as shown. The session module (230) may be configured to provide a session identifier (260) to a particular advertiser device (130) and to receive feedback (270) from the advertiser device (130). Elements and functions of the exemplary publisher subsystem (140) of FIG. 2 will now be described in additional detail.

1. Bid Module

The bid module (210) may be configured to solicit and receive bids from advertisers, including bids submitted by the advertiser devices (130) over the data communication network (150). Bids may be solicited using an open or sealed bid process, as will be understood by those skilled in the art. The bid module (210) may be configured to provide received bid data to the data store (240), which can store the data for subsequent access and use, including making determinations as to how the bid amounts will be allocated among the publisher and one or more affiliates.

The bid module (210) may be configured to provide templates (e.g., Hypertext Mark-up Language ("HTML") templates) to advertiser devices (130), the templates being designed to accept input from advertisers associated with the advertiser devices (130). The templates may define user interfaces helpful for the input of bid data.

The bid module (210) may be configured to solicit and receive other types of input from advertiser devices (130). For example, the bid module (210) may receive advertisement data from advertiser devices (130). Advertisement data may include information associated with paid advertisements including, but not limited to, billing information, advertisement content, addresses associated with advertiser devices (130) and/or sites hosted by advertiser devices (130), hyperlinks, Hypertext Markup Language ("HTML") templates, advertiser identifiers, keywords, metadata, metatags, and any other information potentially helpful for publishing advertisements, directing consumers to sites hosted by advertiser devices (130), communicating with advertiser devices (130), billing advertisers, and allocating advertising revenues.

2. Publish Module

The publish module (220) may be configured to receive requests for content from access devices (110) and/or affiliate devices (120) over the data communication network (150). The requests may include search queries submitted by consumers to either the publisher subsystem (140) or affiliate devices (120). The search queries may include one or more keywords to be used to search for content related to the keywords.

The publish module (220) may be configured to search for and identify content related to keywords (or other information) included in search queries. The publish module (220) may employ any electronic search technologies suitable for searching for and identifying related content, including any search engine technologies known to those skilled in the art.

The publish module (220) may be configured to publish the identified content for access over the data communication network (150). Content may be published on a site hosted by publisher subsystem (140) or on a site hosted by a particular affiliate device (120). The published content may include or be in the form of search results and may include one or more paid advertisements. As described above, the placement of the paid advertisements within the search results may be based at least in part on bids received from the advertisers associated with the advertisements. The publish module (220) may also store the identified content to the data store (240).

Consumers may use access devices (110) to access the published content and to select one or more advertisements included in the published content.

The publish module (220) may be configured to publish content over the data communication network (150) in a wide variety of formats. For example, the content may include search results, as described above. By way of another example, the content may include video content (e.g., television programming content) having advertisements included therein.

3. Session Module

The session module (230) may be configured to recognize consumers selecting (e.g., clicking on) advertisements included in published content. For example, the session module (230) may be configured to detect, over the data communication network (150), when a hyperlink included in or otherwise associated with an advertisement is selected by a consumer using an access device (110).

Upon detecting a selection of a particular advertisement, the session module (230) may initiate a session between the access device (110) (e.g., access device (110)-1) and an advertiser device (130) (e.g., advertiser device (130)-1) that is associated with the selected advertisement. To initiate the session, session module (230) may direct the access device (110) to the advertiser device (130) and/or to a site hosted by the advertiser device (130), as will be understood by those skilled in the art.

As part of initiating the session, the session module (230) may be configured to provide a session identifier (260) to the advertiser device (130). The session identifier (260) may be in any form and include any information suitable for identifying the session, such as a numeric or alphanumeric code, for example. The session identifier (260) may be used in place of other types of information so as to limit the information made available to the advertiser device (130). This may be helpful for protecting the system (100) from manipulation. For example, the use of unique session identifiers (e.g., session identifier (260)) can make it difficult for advertisers to manipulate the allocation of advertising revenues because the advertisers are not provided with information related to the sources of sessions. Accordingly, advertisers are unable to favor a particular affiliate because the advertisers are unaware which sources are being rated by feedback (e.g., feedback (270)).

The session module (230) may be configured to perform additional operations to limit the information made available to advertiser devices (130). For example, the session module (230) may be configured to mask the Internet Protocol ("IP") addresses associated with affiliate devices (120) and/or the publisher subsystem (140). Marking of IP addresses will be understood by those skilled in the art. The publisher subsystem (140) may be configured to provide additional information (e.g., IP addresses and/or information about sources of results) to advertiser devices (130) once feedback has been received.

Sessions initiated by the session module (230), as well as the session identifiers associated with the sessions may be recorded and stored to the data store (240). Sessions may be conducted between access devices (110) and advertiser devices (130) in any of the ways described above and may include occurrences of one or more predefined session events, such as any of the exemplary session events listed above. As previously described, advertiser devices (130) may be configured to provide feedback (e.g., feedback (270)) to the publisher subsystem (140) based on the occurrences or lack of occurrences of predefined events during the session.

Accordingly, the session module (230) may be configured to receive feedback (270) from the advertiser device (130). The session module (230) is able to associate feedback (270) with a corresponding session identifier (260). The feedback (270) may be stored in the data store (240), along with the session identifier (260) associated with the feedback (270). The feedback (270) may include any of the data described above, including data representative of whether a predefined event occurred during the session.

In other embodiments, the session module (230) may be configured to receive feedback from advertisers without initiating sessions between access devices (110) and advertiser devices (130). In such embodiments, the session module (230) may simply receive feedback from advertisers, and use the feedback to identify sources (e.g., publishers of an advertisement) that led consumers to initiate sessions with the advertisers, the sessions being the reasons for the feedback. For example, the publish module (220) may publish content over the data communication network (150), and a consumer may react to an advertisement in the content by contacting the advertiser associated with the advertisement. The advertiser may use a particular advertiser device (130) to provide feedback to the session module (230), the feedback being descriptive of one or more results produced during the session.

The system (100) may be configured to identify bogus advertiser feedback. For example, the session module (230) may be configured to deliver one or more test sessions to advertiser devices (130). The test sessions may include session identifiers but do not include or perform actions that would result in positive feedback. Accordingly, if any particular advertising device (130) provides positive feedback in association with a test session, the publisher subsystem (140) is able to flag the positive feedback as being bogus. Allocation module (140) may be configured to recognize and flag any positive feedback that has been received for a test session. In this manner, the publisher can identify advertisers who may be trying to manipulate the system (100).

4. Data Store

The data store (240) may include one or more data storage mediums, devices, or configurations and may employ any type, form, and combination of storage media known to those skilled in the art, including hard disk drives, read-only memory, caches, databases, optical media, and random access memory. The data store (240) may include any known technologies useful for storing, updating, modifying, accessing, retrieving, and deleting data.

The data store (240) may include any suitable type or form of electronic data representative of or associated with session feedback, session identifiers, user access privileges, bids received from advertisers, advertisements, information associated with advertisers, affiliates, and consumers, information associated with access devices (110), affiliate devices (120), and advertiser devices (130), and any other information that may be potentially useful for allocating advertising revenues based on session feedback. The data may be stored in extensible markup language ("XML"), or in any suitable form.

While FIG. 2 illustrates the data store (240) as being included in the publisher subsystem (140), this is not limiting. For example, the publisher subsystem (140) may be configured to store and/or retrieve data to/from external data sources. Any data potentially helpful for collecting session feedback and allocating advertising revenues based on the feedback may be retrieved from any suitable and accessible internal or external data source.

Feedback and session identifiers stored in the data store (240) can be used to allocate advertising revenues. The data may be organized per advertiser, advertiser device (130), advertisement, or other suitable criteria. Feedback for a particular advertiser may be aggregated during or after a predefined time interval to which a particular bid submitted by the advertiser is associated. After the predefined time interval has expired, the aggregate of the feedback received during the predefined time interval may be used to determine an allocation of the advertising revenue (i.e., an allocation of the bid amount) paid by the advertiser for placement of the advertisement during the predefined time interval.

5. Allocation Module

The allocation module (250) may be configured to allocate advertising revenues based on feedback received from advertisers. The allocation of revenue may be determined for each advertiser and for each predefined time interval. For example, if a particular advertiser submits a bid for placement of an advertisement during a predefined time interval, the allocation module (250) can use feedback received from the advertiser for any sessions occurring during the predefined time interval to determine an allocation of the bid between sources of the sessions having positive feedback. Typically, the amount of the bid will be allocated between the publisher and one or more affiliates, depending on a ratio of positive feedback received for each source.

For instance, if an advertiser submits a bid of $500 for placement of an advertisement during a predefined time interval, after expiration of the predefined time interval, the allocation module (250) is able to allocate the $500 based on feedback received from the advertiser during the predefined time interval. If twenty-five sessions were initiated during the predefined time interval, and feedback received from the advertiser indicated that ten of the twenty-five sessions resulted in an occurrence of a predefined event (e.g., a sale), the $500 would be allocated between the sources of the ten productive sessions having positive feedback.

The $500 may be allocated to the sources in proportion to the number of productive sessions that each source produced. For example, if the publisher subsystem (140) was the source of six of the ten productive sessions, the affiliate device (120)-1 was the source of three of the ten productive sessions, the affiliate device (120)-2 was the source of none of the ten productive sessions, and the affiliate device (120)-J was the source of one of the ten productive sessions, the allocation module (250) would allocate the $500 at a ratio of sixty percent (60%) to the publisher associated with the publisher subsystem (140), thirty percent (30%) to the affiliate associated with the affiliate device (120)-1, zero percent (0%) to the affiliate associated with the affiliate device (120)-2, and ten percent (10%) to the affiliate associated with the affiliate device (120)-J. In other words, $300 would be allocated to the publisher, $150 would be allocated to the first affiliate, no money would be allocated to the second affiliate, and $50 would be allocated to the last affiliate. Of course, the publisher may deduct fees from the shares to be distributed to the affiliates, as will be understood by those skilled in the art.

The publisher subsystem (140) may be configured such that the feedback from advertisers is used to determine the allocation of advertiser costs but does not affect the amount of costs. In other words, the costs to the advertiser may be independent of the feedback received from advertisers. For example, the $500 bid received from the advertiser in the preceding example will not increase or decrease based on the feedback received from advertisers. The feedback determines the allocation of the $500 bid and not the amount of the bid. In other words, the system (100) provides an allocation-per-feedback advertising model. Because feedback has no effect on advertiser costs (i.e., bid amounts), advertisers do not have a financial incentive to underreport results (e.g., the occurrences of predefined events during sessions). The disconnection between advertiser feedback and cost makes the system (100) easy to police when compared to conventional PPC and PPA advertising models.

The disconnection between number of clicks or sessions and advertiser cost also broadens the type of productive content that advertisers may include in advertisements. For example, advertisers are not limited to the use of hyperlinks to initiate sessions between advertisers and consumers. For example, an advertisement may include a message prompting a consumer to call a telephone number.

The system (100) can help increase revenues for the publisher. Increases in revenues may come from one or more sources, including savings on expenses that would have normally been spent to police conventional paid advertising implementations, elimination or reduction of revenue distributions to unproductive or illegitimate affiliates, an increase in the number of productive affiliates attracted to the team with the publisher by the greater share of revenues paid to productive affiliates, and an increased desire on the part of current and new affiliates to develop more productive content due to the greater rewards of creating productive content.

Moreover, advertisers are not limited by maximum cost ceilings commonly used in conventional pay-per-click advertising models. In such models, an advertiser often set a maximum amount that could be charged to the advertiser. Once the number of clicks on the advertiser's advertisement caused the maximum charge to be reached, the advertisement would normally be removed from published content, effectively pulling the advertisement. This can prevent advertisers from obtaining additional sales. The system (100) addresses this problem by treating bid amounts independently of results. Accordingly, the system (100) promotes the acquisition of results throughout a predefined time interval during which an advertisement has a paid right to be presented with published content. Increased revenue for advertisers may make advertisers more willing to increase bid amounts to win placement of advertisements, thereby increasing revenues for the publisher and any productive affiliates. Thus, the system (100) helps maximize revenues.

In some cases, publisher revenues may also be increased by allowing advertisers to bid for placement rights that are effective during an extended period of time. This enhances the importance of bids, which may drive up bid amounts. In addition, advertisers can reduce bidding costs by not having to bid as often as is common in conventional paid search advertising models. Increased importance and increased convenience may lead to increased bids from advertisers.

Feedback may also be used to influence the placement of advertisements in published content. For example, the feedback may be used to determine a result rate for an advertisement or advertiser, and the publish module (220) may be configured to factor the result rate into the placement of an advertisement within published content. This helps the publish module (220) to prioritize relevant and successful advertisements, thereby increasing the relevancy of the content included in the search results.

The use of results rates to determine placement of advertisements may give advertisers an incentive to over-report actual results in order to receive priority placement in search results. However, the publisher subsystem (140) may be configured to identify when results are inflated or manipulated by advertisers. As described above, the use of session identifiers can prevent advertisers from knowing which sources are being rated by session feedback. Therefore, it would be nearly impossible for an advertiser to know conversion rates delivered by the affiliates, as reported by other advertisers. Accordingly, the publisher subsystem (140) may be configured to compare feedback (e.g., result rates of feedback) reported by any particular advertiser with the feedback (e.g., result rates) reported by other advertisers and to identify any extraordinary anomalies. Such anomalies may be defined as differences in result rates that exceed a predetermined threshold. This allows the publisher subsystem (140) to easily monitor and flag feedback that is out of line with results reported by other advertisers. The allocation module (250) may be configured to disregard results that are flagged as being out of line with other reported results in order to avoid allocating revenue to affiliates that may be cooperating with an advertiser to provide inflated positive feedback that unjustly enriches the affiliate. If the publisher considers factors such as advertiser closing ratios in its ranking of advertisements, the allocation module (250) may also be configured to disregard results that are flagged as being out of line with other reported results in order to prevent an advertiser from manipulating their ranking by inflating positive feedback on some or all sessions. Comparing the feedback from one advertiser with feedback scores established by numerous other advertisers may identify and prevent attempts to cheat or manipulate the system (100).

III. Exemplary Process View

Figure 3:
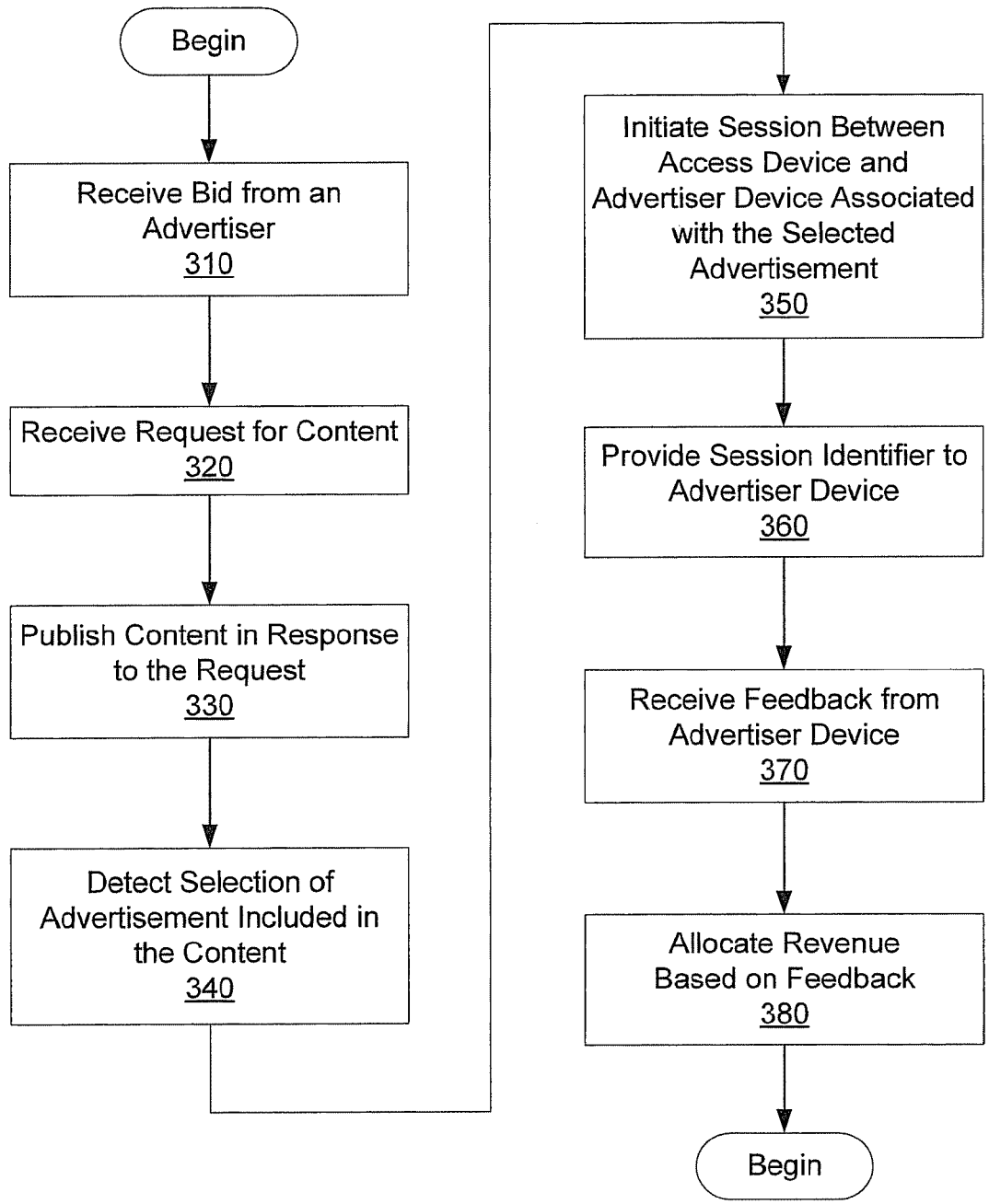
FIG. 3 is a flowchart illustrating an exemplary paid search advertising process, according to principles described herein.

FIG. 3 illustrates an exemplary paid search advertising process. While FIG. 3 illustrates exemplary steps according to one embodiment, other embodiments may omit, add to, reorder, and/or modify any of the steps shown in FIG. 3.

In step 310, a bid is received from an advertiser. Step 310 may be performed in any of the ways described above, including an advertiser using a device (e.g., the advertiser device (130)-1) to provide a bid to the publisher subsystem (140) over a data communication network (e.g., the data communication network (150)). The bid may be for placement of an advertisement in content published during a predefined time interval, as described above.

In step 320, a request for content is received. Step 320 may be performed in any of the ways described above, including receiving a request (e.g., a search query) for content directly or indirectly from a consumer using an access device (e.g., the access device (110)-1).

In step 330, content is published in response to the request. Step 330 may be performed in any of the ways described above, including posting the content to a site hosted by the publisher subsystem (140) or an affiliate device (e.g., affiliate device (120)-1) such that the content is available to the consumer through an access device. As described above, the published content may include one or more advertisements associated with advertisers, including an advertisement associated with the bid received in step 310.

In step 340, a selection of an advertisement (e.g., the advertisement associated with the bid received in step 310) included in the content is detected. Step 340 may be performed in any of the ways described above.

In step 350, a session is initiated between an access device and an advertiser device associated with the selected advertisement. Step 350 may be performed in any of the ways described above, including the access device being directed to a site hosted by the advertiser device.

In step 360, a session identifier (e.g., the session identifier (260)) is provided to the advertiser device. Step 360 may be performed in any of the ways described above, including the session module (230) determining and providing data representative of the session identifier to the advertiser device.

In step 370, feedback (e.g., the feedback (270)) is received from the advertiser device. Step 370 may be performed in any of the ways described above, and the feedback may include data representative of any of the information described above, including an indication of results produced by the session. Step 370 may include aggregating feedback received from the advertiser device over a predefined time interval, as described above.

In step 380, revenue is allocated based on the feedback. The revenue may include the amount of the bid received in step 310. Step 380 may be performed in any of the ways described above, including allocating the revenue among the publisher and one or more affiliates based on a ratio of productive sessions initiated by the publisher subsystem (140) and one or more affiliate devices (120), as indicated by the feedback received in step 370. The allocation generally rewards productive sources of results without rewarding sources of sessions that do not add value to advertisers.

IV. Alternative Embodiments

The preceding description has been presented only to illustrate and describe embodiments of the principles described herein. It is not intended to be exhaustive or to limit the disclosure to any precise form disclosed. The principles described herein may be practiced otherwise than is specifically explained and illustrated without departing from their spirit or scope. For example, the principles described herein may be implemented in a wide variety of electronic marketing applications, including, but not limited to, online search advertising, paid online search advertising, paid advertising, advertising associated with Internet Protocol based ("IP-based") video applications (e.g., IP television), and any other marketing application in which advertiser costs can be allocated (e.g., among the publisher of advertising content and one or more affiliates of the publisher) based on feedback received from advertisers. It is intended that the scope of the invention be defined by the following claims.

What is claimed is:

1. A method comprising:
    receiving a revenue bid from an advertiser, the bid being a fixed amount for placement of an advertisement in content being published for a specified amount of time;
    publishing content, the content including the advertisement;
    detecting a selection of the advertisement;
    initiating a session between an access device and an advertiser device associated with the advertisement in response to said detection;
    receiving feedback from the advertiser device;
    allocating said fixed amount of said revenue bid based on the feedback.

2. The method of claim 1, further comprising
    comparing said feedback received from the advertiser device with other feedback received from one or more other advertiser devices; and
    identifying when said feedback includes an anomaly in comparison to said other feedback.

3. The method of claim 1, wherein said receiving step includes:
    receiving positive feedback if a predefined event occurred during the session;
    receiving negative feedback if the predefined event did not occur during the session; and
    wherein said receiving step includes receiving an indication of an amount of value provided to the advertiser associated with the advertiser device during the session.

4. The method of claim 1, further comprising:
    providing a session identifier to the advertiser device; and
    associating the feedback with the session identifier.

5. The method of claim 1, further comprising:
    receiving a query, and
    identifying search results based on the query, the search results including the advertisement,
    wherein said publishing step is performed in response to the query, the content including the search results.

* * * * *